United States Patent [19]

Munz

[11] 3,726,325
[45] Apr. 10, 1973

[54] VALVE MECHANISM FOR CONTROLLING THE FLOW OF A PLASTIC MATERIAL FOR MANUFACTURING AND FILLING A PLASTIC HOLLOW BODY

[75] Inventor: Paul Munz, Netstal, Switzerland

[73] Assignee: Maschinenfabrik Und Giesserei Netstal AG, Netstal, Switzerland

[22] Filed: Nov. 27, 1970

[21] Appl. No.: 93,162

[52] U.S. Cl. ............... 141/317, 53/140, 92/129, 92/168, 141/372, 222/504, 239/412, 251/63.4
[51] Int. Cl. ........... B67c 3/00, B65b 1/04, B65b 3/04
[58] Field of Search ............. 18/5 BA; 53/140; 74/18.2; 92/129, 168; 141/301, 311, 317, 372, 98; 222/504, 309; 239/412; 251/63.4–63.6

[56] References Cited

UNITED STATES PATENTS

| 3,087,518 | 4/1963 | Scholle | 141/317 X |
| 2,983,480 | 5/1961 | Greenlie | 74/18.2 X |
| 1,651,773 | 12/1927 | Jarvis | 251/63.4 X |
| 3,463,363 | 8/1969 | Zelna | 222/504 X |
| 3,012,700 | 12/1961 | Mayer, Jr. | 222/504 X |

Primary Examiner—Houston S. Bell, Jr.
Attorney—McGlew and Toren

[57] ABSTRACT

A device for manufacturing and filling a plastic hollow body includes a hollow supporting sleeve for a hollow plastic blank which is to be blown up, and a valve in the sleeve cooperating with the free end of the sleeve. The sleeve is supported by a cylinder casing having a widened area defining an inlet chamber connected to an inlet for receiving the material to be filled into the hollow body and connected to the bore of the sleeve. The valve is operated by a control mechanism which is sealed from the inlet chamber by a diaphragm. The diaphragm carries an actuation member which is displaced by a control piston of the control mechanism to cause actuation of the valve at the free end of the supporting sleeve.

3 Claims, 1 Drawing Figure

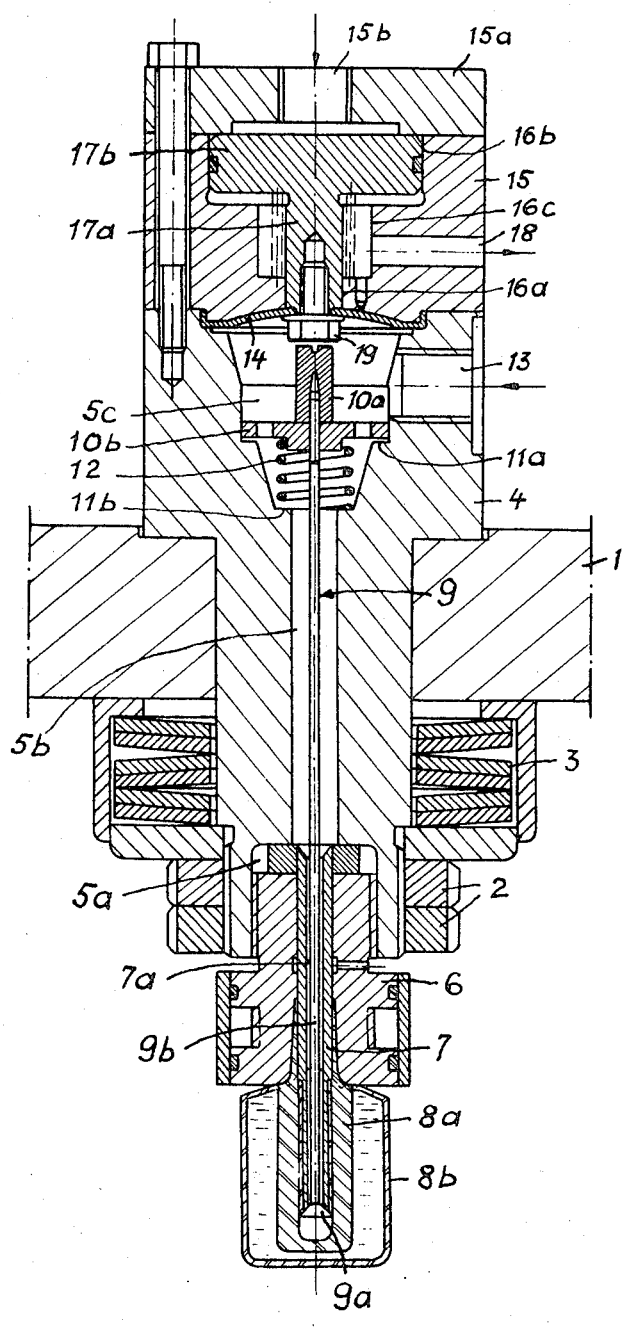

VALVE MECHANISM FOR CONTROLLING THE FLOW OF A PLASTIC MATERIAL FOR MANUFACTURING AND FILLING A PLASTIC HOLLOW BODY

SUMMARY OF THE INVENTION

This invention relates in general to the construction of filling control devices and, in particular, to a new and useful device for manufacturing and filling a plastic hollow body having a valve operating mechanism with an operating control which is sealed from the valve space.

It is known to produce hollow bodies from plastic by blowing up a hollow blank in a plastic state by means of the filling liquid and to fill it at the same time. With such a process, it is possible to pack sterile liquids as they are used, for example, in the pharmaceutical industry including such liquids as distilled water, salt and glucose solutions, etc. These materials are packed directly in plastic ampoules which are sealed during the manufacture and filling so that it is not necessary to provide a subsequent sterilization thereof.

The blown-up and filled hollow bodies or ampoules are usually filled to the brim, and this is not desirable, however, since the filling liquid can spill over by the movements of the arrangement and the shrinking of the ampoules over a period of time until the neck becomes closed and is welded shut. Another problem is that filling liquids which are used are corrosive or highly reactive and they, therefore, should not come in contact with bearing and guide points of the operating mechanism.

In accordance with the invention, there is provided a hollow supporting sleeve for the hollow plastic blank which is to be blown-up. An interior valve member extends through the sleeve and the sleeve defines the flow passage for the filling material. The valve shaft extends beyond the sleeve and into an enlarged filling chamber defined at the interior of a cylindrical casing therefor. The valve is actuated by a control mechanism which, in accordance with the invention, is separated in a liquid-tight manner from the liquid feed inlet and the filling chamber.

With the inventive construction, it is possible to operate the valve independently of the pressure conditions in the liquid feed duct and to keep it open, particularly after the blank has been blown-up and the hollow body is filled in order to be able to draw back excess liquid. In addition, the control mechanism and its guides or working media, in the case of a hydraulic or pneumatic device, are completely separated from the path of the filling liquid. This ensures a reduction of wear and susceptibility to difficulties of operation and provides a sealing arrangement which is inexpensive. In addition, it also permits a free selection of the most expedient control mechanism which can operate, for example, mechanically, magnetically, hydraulically or pneumatically. In practice it was found particularly advantageous to provide a construction in which the valve shaft is not rigidly connected with the operating means of the valve control mechanism. In order to separate the liquid feed ducts from the control mechanism, it is advisable to provide a diaphragm over which the control of the valve can be effected.

Accordingly, it is an object of the invention to provide an improved filling control mechanism for filling hollow bodies with a fluid which includes an inlet chamber connected to a filling passage through which the filling fluid is directed and which is closable by a valve; and wherein the valve is actuated by a control which is separated from the filling passages in a sealed chamber.

A further object of the invention is to provide a device for filling hollow plastic ampoules with a liquid which is directed into the ampoule under the control of a valve member which is actuated by a control mechanism operating through a sealing diaphragm.

A further object of the invention is to provide an operating valve for filling small plastic bodies which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a longitudinal sectional view of a filling mechanism with a control valve constructed in accordance with the invention.

GENERAL DESCRIPTION OF THE PREFERRED EMBODIMENT

Referring to the drawing in particular, the invention embodied therein comprises a device for filling small plastic hollow bodies such as ampoules and which includes a cylindrical casing 4 which is clamped vertically in a supporting plate 1 by a pair of nuts 2 which are threaded onto the casing 4 and which bear against disc springs 3. The lower end of the casing 4 carries a blow head 6 which surrounds an elongated sleeve member or filling tube 7 which defines an interior filling passage. The blow head 6 is widened around the sleeve 7 at its lower end to accommodate a neck of an ampoule or ampoule blank 8a. The blow head 6 forms the upper part of a blow mold (not completely shown) into which can be injected around the supporting sleeve 7 the ampoule blank 8a which is arranged within an outer cylindrical mold container 8b.

In accordance with the invention, a valve member, generally designated 9, includes a lowermost end with a valve disc 9a and a vertically elongated shaft portion or rod 9b. The rod 9b is located within the sleeve 7. It is spaced from the interior wall thereof to provide for a flow passage of the filling liquid.

The cylinder casing 4 includes an intermediate passage portion 5b which continues the liquid inlet flow passage at the upper end of the flow passage 7a of the sleeve 7 and it connects at its upper end into a widened area or inlet chamber 5c having a lateral inlet passage 13 for the inlet liquid.

The upper end of the valve rod portion 9b is provided with a pin or stop member 10a located over a guide disc 10b which is guided in the cylindrical widened portion 5c. The disc 10b limits the opening stroke in cooperation with a case shoulder 11a. A helical spring 12 acts between the shoulder 11b and the underside of the disc 10b and it urges the valve member 9 in a direction to close the valve disc 9a.

The filling liquid which is directed into the inlet chamber 13 may flow from the widened passage or inlet chamber 5c through openings in the valve disc 10b and downwardly through the passage 5b to the passage 7a for discharge when the valve disc 9a is in an open position into the blank 8a.

In accordance with a feature of the invention, the inlet chamber 5c is closed at top by a sealing diaphragm 14 and this diaphragm is clamped tightly between the casing head 15 and the cylindrical casing 4. The casing head 15 forms the guide cylinder of a hydraulic or pneumatic control mechanism for operating the valve 9. An operating piston 17b is slidable in a chamber 16b of the casing head 15 and it includes a central shaft or hub portion 17a which engages over a shank portion of an adjustable screw 19 carried by the diaphragm 14 and threaded into shaft 17a of piston 17b. The working fluid inlet 15b is defined in a cover 15a of the casing head 15 and a working fluid such as oil or air is admitted through this passage for the purpose of controlling the movement of the piston 17b. The head 15 includes a vent opening or bleed 18 to permit displacement of fluid ahead of the piston 17b during its downward movement. The piston is moved downwardly to cause deflection of the diaphragm 14 and displacement of the engagement member in the form of a head screw 19 which engages and displaces the pin 10a and the valve 9 downwardly to open the valve by moving the disc 9a off of its associated seat at the lower end of the sleeve member 7.

The method of operation of the device is as follows:

After the ampoule blank 8a is positioned within the outer container 8b and the blank is affixed to the lower end of the blow head 6 around the filling passage defined by the tubular member 7, the core carrying blank 8a is dipped into a blow mold. Then piston 17b is pressed downwardly, by means of the head screw 19 for an admission of an operating fluid through the chamber 15b to actuate the piston 17b. This opens the valve disc 9a and filling liquid is supplied under pressure so that the liquid issuing from the lower end of the passage 7a causes the blowing up of the ampoule 8a. *After the blowing, some liquid is again withdrawn with the valve still open. Thereafter, the valve can be closed which is effected by relieving the piston 17b to cause spring 12 to urge the valve rod 9b in an upward direction to close the valve disc 9a.*

Since the operating piston 17b and the head screw 19 are not rigidly coupled with the valve rod, the valve can also be opened by liquid pressure which might appear in the passages 5c and 5b and 7a, but in this way, damage to the valve can be avoided. By providing the seal of the diaphragm 14 to close the inlet chamber 5c from the control mechanism, there will be no undesired contact of the filling liquid with parts of the control mechanism or its hydraulically operated fluid. The liquid feed duct of this arrangement is designed for optimum flow without any dead angles of admission, and this facilitates the sterile cleaning of the whole device, preferably by blowing it out with a fluid medium such as steam.

While a specific embodiment of the invention has been shown and described in detail to illustrate the application of the principles of the invention, it will be understood that the invention may be embodied otherwise without departing from such principles.

What is claimed is:

1. An arrangement for simultaneously manufacturing and filling a plastic hollow body, comprising a cylindrical housing defining an elongated filling passage therein and having a lower blow head portion with means for holding a hollow blank in alignment with the passage in a position to be formed and filled by a filling liquid, a valve member displaceable in the passage and including a valve part for opening and closing said passage, an inlet defined in said housing communicating with said passage, a control mechanism being engageable with said valve member and being operable to cause said valve part to open and close said passage, a diaphragm covering said passage upstream of said inlet and sealing said control mechanism in respect to said inlet and being spaced above said valve member when said valve part is in a closed position, said housing having a casing head of a diameter at least as great as said diaphragm and engaging said diaphragm in a marginal area around its periphery above said inlet in a position to seal off said inlet from said control mechanism, means biasing said valve member in a direction to cause said valve part to close said passage, said control mechanism including an actuating member being disposed within said housing and centrally supporting said diaphragm and being displaceable to move said diaphragm to cause it to contact and move said valve member to displace said valve part to open said passage.

2. An arrangement according to claim 1, wherein said valve member includes a shaft portion, said casing head having a hollow interior chamber, a piston slidable in said chamber and engageable with said diaphragm and comprising said actuating member.

3. An arrangement according to claim 2, wherein said actuating member includes an adjusted screw threaded to said piston and being adjustably positionable in respect to said piston for varying the operating stroke of said valve.

* * * * *